United States Patent
Monty

(10) Patent No.: US 7,583,718 B2
(45) Date of Patent: Sep. 1, 2009

(54) OPTICAL MOUNTING SCHEME FOR WAVEGUIDE LASERS AND WAVEGUIDE LASER INCORPORATING THE SAME

(75) Inventor: Nathan P. Monty, Charlton, MA (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 11/819,333

(22) Filed: Jun. 26, 2007

(65) Prior Publication Data

US 2008/0043801 A1 Feb. 21, 2008

Related U.S. Application Data

(60) Provisional application No. 60/816,344, filed on Jun. 26, 2006.

(51) Int. Cl.
 *H01S 3/03* (2006.01)
(52) U.S. Cl. .............. 372/65; 372/61; 372/103; 372/108
(58) Field of Classification Search ............. 372/61, 372/65, 103, 108
See application file for complete search history.

(56) References Cited

U.S. PATENT DOCUMENTS

| | | | |
|---|---|---|---|
| 4,890,294 A * | 12/1989 | Nishimae et al. ............ 372/57 |
| 7,050,475 B2 | 5/2006 | Monty | |
| 7,197,060 B2 | 3/2007 | Monty | |
| 7,230,967 B2 | 6/2007 | Monty | |
| 2005/0152425 A1 | 7/2005 | Monty | |
| 2005/0257912 A1 | 11/2005 | Monty et al. | |
| 2006/0085992 A1 | 4/2006 | Monty et al. | |
| 2006/0153264 A1 | 7/2006 | Monty | |

OTHER PUBLICATIONS

U.S. Appl. No. 60/816,344, filed Jun. 26, 2006.

* cited by examiner

*Primary Examiner*—Minsun Harvey
*Assistant Examiner*—Tod T Van Roy
(74) *Attorney, Agent, or Firm*—Joseph A. Yosick

(57) ABSTRACT

Certain example embodiments of this invention relate to waveguide lasers (e.g., RF-excited waveguide lasers). Certain example embodiments of this invention provide an optical mounting scheme for use with a waveguide laser. In certain example embodiments, a carrier including an optic holder may be provided. An optic may be mounted to the carrier via a face-sealing epoxy. An optic interface may be formed at least in part by the epoxy. The optic interface may be a thin layer of a substantially uniform thickness located between the carrier and optic face. The carrier and/or the optic holder of the carrier may be beveled proximate to where the optic interface is formed and, optionally, proximate to where the epoxy is applied. In certain example embodiments, the epoxy may be applied to only the optic's face and/or to the optic holder's face. In certain example embodiments, the waveguide laser may further comprise a vacuum vessel, and the carrier may be attached to the laser such that the optic and/or the optic interface attached to the carrier fit inside of the vessel.

14 Claims, 4 Drawing Sheets

OPTICAL MOUNTING SCHEME FOR WAVEGUIDE LASERS AND WAVEGUIDE LASER INCORPORATING THE SAME

CROSS-REFERENCE TO RELATED APPLICATION

This application claims the benefit of U.S. provisional patent application No. 60/816,344, filed on Jun. 26, 2006, the entire content of which is hereby incorporated herein by reference.

FIELD OF THE INVENTION

Certain example embodiments of this invention relate to waveguide lasers including but not limited to RF-excited waveguide lasers. Certain example embodiments of this invention relate to an optical mounting scheme for use with a waveguide laser (e.g., a $CO_2$ laser), and/or waveguide lasers incorporating the same.

BACKGROUND AND SUMMARY OF EXAMPLE EMBODIMENTS OF THE INVENTION

A waveguide laser often includes mirrors, concave or flat, defining an optical resonator cavity coupled together with a waveguide defining an optical path between the mirrors.

The waveguide typically includes a channel ground into a ceramic block (e.g., $Al_2O_3$) with a lower electrode of aluminum and/or copper added to complete a cross-section of the waveguide. Alternatively, the waveguide can be ultrasonically drilled down through a piece of ceramic such as aluminum oxide ($Al_2O_3$) to create a continuous closed bore length with upper and lower electrodes parallel to the bore length. Typically, the positive arm of the oscillating electromagnetic field (e.g. Radio Frequency or RF) supply is coupled into the upper electrode of the waveguide, and the ground plane of the RF supply is coupled to the lower electrode. Resonance is added between and along the length of the upper electrode to distribute the RF voltage evenly along the length of the electrodes. Finally, the mirrors and waveguide structure are aligned and housed in a vacuum vessel (laser housing) that holds the gas to be excited.

Unfortunately, conventional waveguide lasers suffer from several disadvantages relating, for example, to the ways in which an optic may be coupled to the lasers. For example, many conventional techniques include additional physical components and/or adjusters that require additional mounting and/or clamping steps. Such steps introduce additional costs, in terms of the physical components as well as the labor required for the mounting and/or clamping. In these and/or other configurations, stresses are introduced directly on and/or proximately to the optic. Such stresses may cause the optic to become misaligned and/or damaged. Gas also may escape from the vessel. Thus, the laser's functioning may be adversely impacted.

Thus, it will be appreciated by those skilled in the art that there exists a need for improved waveguide lasers (e.g., $CO_2$, $N_2$, and/or other waveguide lasers) that overcome one or more of these and/or other disadvantages.

One aspect of certain example embodiments of this invention relates to optical mounting techniques for waveguide lasers (e.g., $CO_2$, $N_2$, and/or other waveguide lasers).

Another aspect of certain example embodiments relates to optical mounting techniques wherein tension forces applied to the optic are reduced.

Certain example embodiments relate to a very thin, substantially uniform optic interface for connecting a carrier (or a holder thereof) to an optic. Certain example embodiments relate to attaching such a carrier to the laser.

In certain example embodiments of this invention, a waveguide laser is provided. A carrier including an optic holder may be provided. An optic may be mounted to the carrier via a face-sealing epoxy. An optic interface may be formed at least in part by the epoxy. The optic interface may be a thin layer of a substantially uniform thickness located between the carrier and optic face. The carrier and/or the optic holder of the carrier may be beveled proximate to where the optic interface is formed and, optionally, proximate to where the epoxy is applied.

In certain other example embodiments, an optic mounting system for use with a laser is provided. A carrier including an optic holder may be provided. An optic may be mounted to the carrier via a face-sealing epoxy. An optic interface may be formed at least in part by the epoxy. The optic interface may be a thin layer of a substantially uniform thickness located between the carrier and optic face. The carrier and/or the optic holder of the carrier may be beveled proximate to where the optic interface is formed and, optionally, proximate to where the epoxy is applied.

In certain other example embodiments, a method of attaching an optic to a carrier for use with a gas discharge laser is provided. The carrier including a holder may be provided. The optic may also be provided. Edges of the carrier and/or the holder may be beveled. A face-sealing epoxy may be applied to the optic face and/or the carrier or holder face. Any epoxy that runs down the carrier may be wiped away. A very thin, substantially uniform optic interface may be formed via the epoxy to connect the carrier and the optic.

In certain example embodiments, the epoxy may be applied to only the optic's face and/or to the optic holder's face. In certain example embodiments, by chamfering the inside and outside edges of the sealing surface, at least some of the epoxy may be caused to run down the carrier. In certain example embodiments, the waveguide laser may further comprise a vacuum vessel, and the carrier may be attached to the laser such that the optic and/or the optic interface attached to the carrier fit inside of the vessel. In certain example embodiments, the optic may be an output coupler.

The aspects and embodiments may be used separately or applied in various combinations in different embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
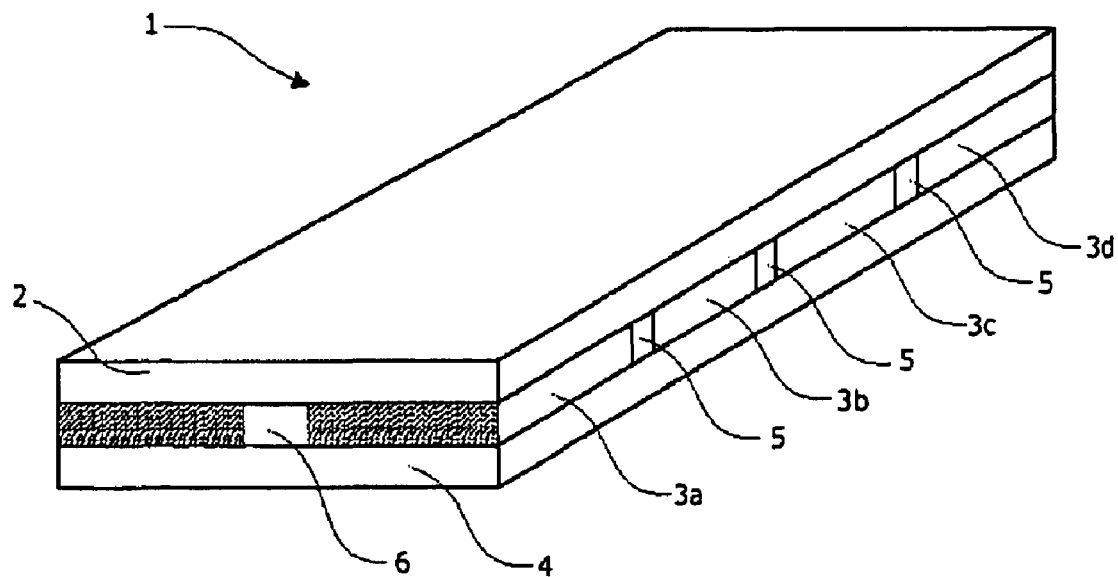
FIG. 1 is a perspective view of a waveguide laser.

Referring now more particularly to the drawings in which like reference numerals indicate like parts throughout the several views, FIGS. 1-4 serve to illustrate the operation of certain waveguide lasers.

FIG. 1 shows a slab waveguide laser 1, comprising a top or upper electrode 2 and a bottom or lower electrode 4. The upper and lower electrodes, 2 and 4 respectively, can have variable shapes (e.g., planar, variable thickness, curved, etc.). Sidewalls 3a-d are sandwiched between the upper electrode 2 and the lower electrode 4 and may be separated by small gaps 5. The width and thickness of the sidewalls are shown shaded. The lengths of the sidewalls are not shaded in FIGS. 1-2. The sidewalls 3a-d may be formed from any suitable material. For example, the sidewalls 3a-d may be constructed of various materials depending on the dielectric properties desired. The sidewalls may be constructed of ceramic materials (e.g., Beryllium Oxide (BeO), Aluminum Nitride (AlN), etc.).

The sidewalls 3a-d and the upper and lower electrodes 2 and 4 respectively can form a waveguide 6. There can be no gaps or any number of gaps between any number of sidewalls 3. The sidewalls may seal the waveguide 6 at a predetermined pressure. For example, the waveguide 6 can be sealed at various pressures depending, for example, upon the lasing medium or desired operating conditions. Also, the waveguide may have electrodes 2 and 4, side walls 3a-d with no gaps. In such an embodiment, the side walls 3a-d would extend and surround the electrodes 2 and 4 to form the housing of the laser itself. Likewise, the electrodes 2 and 4 could form the housing of the laser.

The sidewalls 3a-d (etc.) act to guide the beam to an extent that there is little or no appreciable beam degradation or power loss even if there are gaps between the sections of the sidewalls or sections of the sidewalls and electrodes 2 and 4. Gaps 5 can be of variable size (e.g. about 1-3 mm, or more or less) without substantially affecting the beam.

Figure 2:
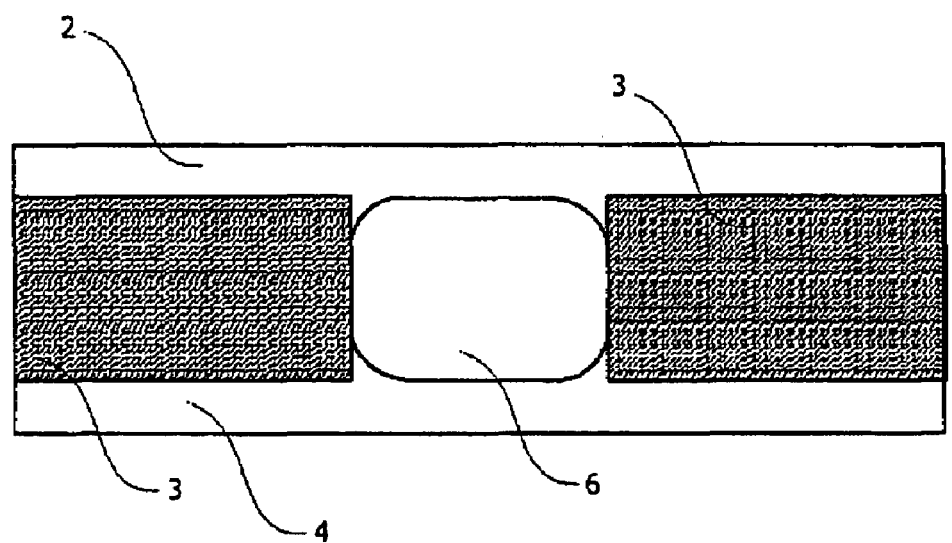
FIG. 2 is a cross-sectional view of a waveguide laser.

FIG. 2 is an end view through a transverse section of the waveguide laser 1 of FIG. 1. The upper electrode 2 and the lower electrode 4 are shown shaped so as to form the waveguide 6, with rounded corners (or corner protrusions). The shape of the electrodes 2 and 4 are easily changed such that easier striking and better mode control of the beam is provided. In waveguide lasers and other types of lasers, it is desirable for circular symmetry to exist in the beam in certain example instances, which will produce a Gaussian shape to the beam intensity. The electrodes may be rounded further than is shown such that there is complete circular symmetry in the waveguide (e.g., the waveguide is completely circular in cross-section) in certain instances. The variable shaping of the cross section of the electrodes can be shaped by conventional methods (e.g., by CNC Milling, etc.).

Figure 3:
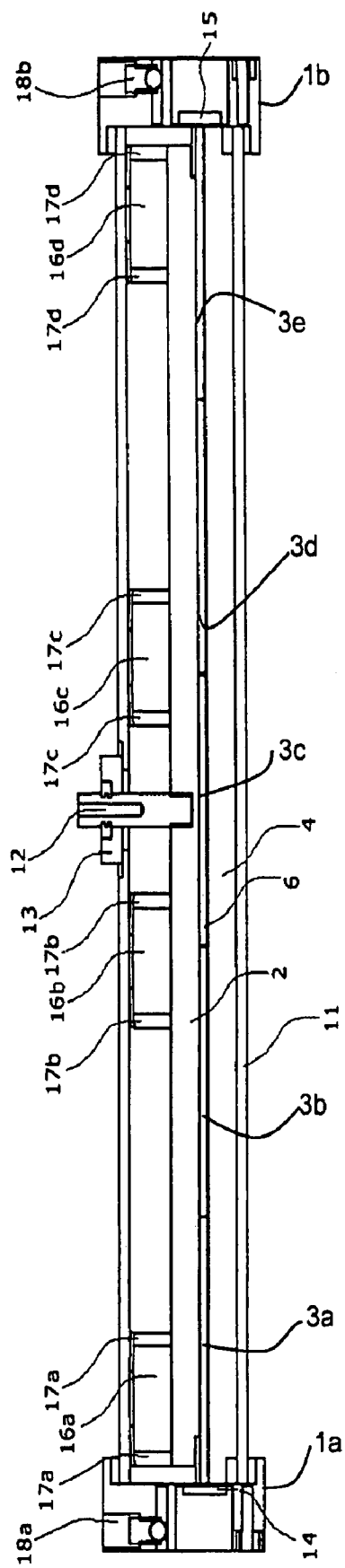
FIG. 3 is a longitudinal view of section IV-IV in FIG. 4 of a laser.
Figure 4:
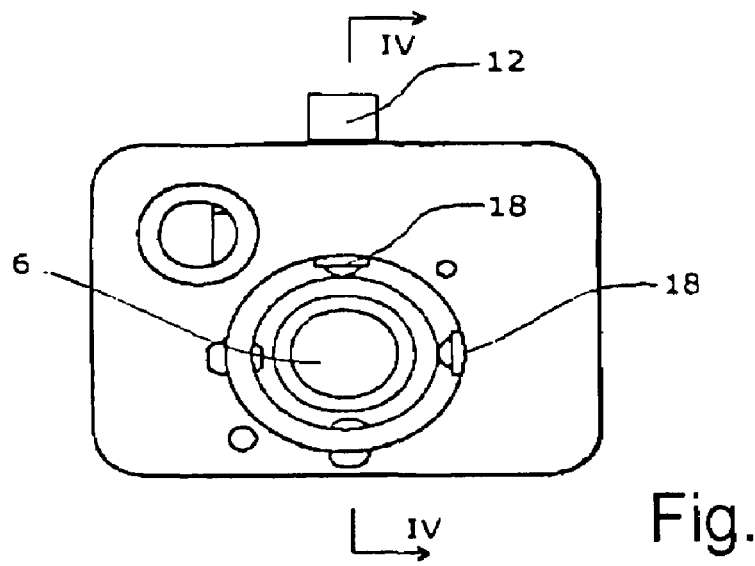
FIG. 4 is an end view from the output coupler end of the laser.

FIG. 3 shows a longitudinal view of section IV-IV of the waveguide laser in FIG. 4. The laser 1 can be disposed within a housing 11 and comprises a cavity located between the two ends 1a and 1b. End 1a comprises a reflective surface and end 1b comprises a partially reflective surface which forms the output coupler. The RF feed-through 12 can be encircled in an insulating casing 13 (e.g., an insulating ceramic casing). The insulating casing 13 can be comprised of various materials (e.g., BeO, AlN, $Al_2O_3$, other suitable insulating and/or dielectric material(s), etc.). Although discussion herein has referred to various components, the arrangement of such components and the presence of such components should not be interpreted as limiting the scope of the present invention. A separate housing is not necessarily needed in a sealed waveguide structure containing reflective elements, where the sidewalls or electrodes additionally form the housing.

The laser 1 can be disposed in a housing 11, with an electrode top or upper plate 2 and bottom or lower electrode plate 4. The top or upper electrode 2 is shown as continuous, but also may comprise one or more sections to assist in alleviating warping caused by, for example, temperature differentials between the topside and bottomside of the electrodes. The waveguide 6 may be disposed between a total reflector 14 and a partially reflecting surface 15. The total reflector 14 and partially reflecting surface 15 may be located at the ends of waveguide 6. The partially reflecting surface 15 may at least partially form the output coupler for the beam. The beam can make one or more passes through the waveguide before exiting at the output coupler. It will be appreciated that the number and placement of waveguides is given by way of example and without limitation. For example, certain lasers may have multiple waveguides, with the waveguides being connected or separate.

The embodiment of FIG. 3 illustrates a case where the ceramic sidewalls 3a-e abut each other, leaving no gaps. In FIG. 3, four ceramic cylinders 16a-d are used to provide a clamping force between the laser housing and the electrode assembly to hold the laser together. The cylinders 16a-d may be made of various materials (e.g., BeO, AlN or $Al_2O_3$, other suitable ceramic, etc.). The cylinders 16a-d are shown as being provided with inductors 17a-d, respectively, which help ensure that the voltage difference along the length of the laser is reduced. At least one power source may be connected via connector 12.

Adjustors 18a-b can be used to adjust the optics. For example, adjustors 18a-b may comprise screw adjustors, although it will be appreciated that other adjustors may be used to adjust the optics in the same planes and/or in other planes in place of, or in addition to, such screw adjustors. Adjustors 18a-b are optional, and the type of adjuster is not limited to optical or other kinds of adjusters.

FIG. 4 is an end view of a laser. Two optic adjustors 18 may be placed orthogonal to each other to facilitate the adjustment of the optics in two planes, both perpendicular to the optical axis of the beam, the optical axis lying parallel to the bore 6. It will be appreciated that other adjustment means, not shown, can be used to adjust the optics in the direction parallel to the beam.

Figure 5:
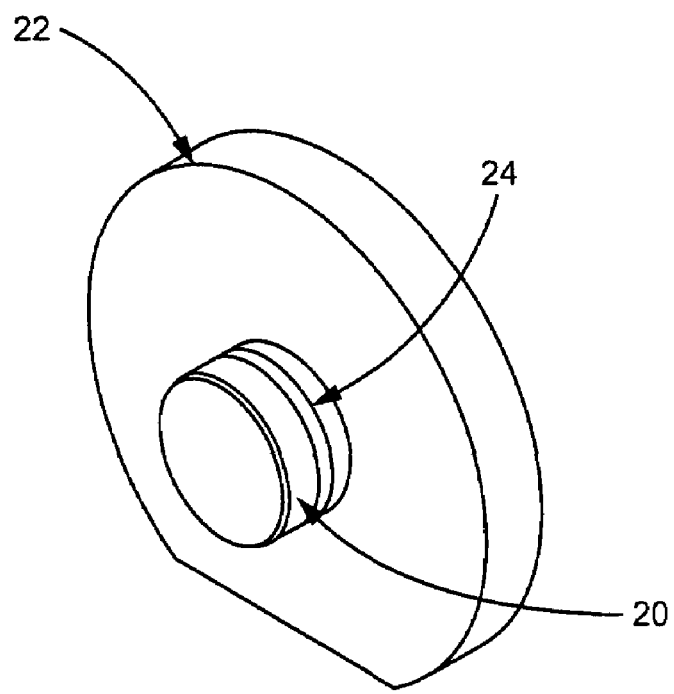
FIG. 5 is a simplified, partial perspective view of a carrier with an optic connected thereto, in accordance with an example embodiment; and, FIG. 6 is a flowchart that illustrates one process for forming an optical interface that may be used when optically mounting an optic to a carrier, in accordance with an example embodiment.

FIG. 5 is a simplified, partial perspective view of a carrier with an optic connected thereto, in accordance with an example embodiment. As can be seen in FIG. 5, the optic 20 is mounted to a carrier 22 via a face-sealing epoxy. Various epoxies may be used depending, in part, on the particular needs of the implementation and the corresponding characteristics of the epoxy. For example, the epoxy may be qualified to be acceptable to the laser gas environment, such that its characteristics include, for example, reduced (or low) outgassing, stability, substantial non-permeability, etc.

The process of forming the optic interface 24 will now be described. The epoxy may be placed (e.g., deposited) on the face of the optic 20 and/or on the face of the holder. Although the epoxy could be placed on the side of the optic, it will be appreciated that this configuration disadvantageously induces stress into the optic. The optic holder or carrier 22 instead or in addition may be beveled proximate to where the epoxy attaches. This reduces the likelihood that the surface tension will create a large bead around the edge of the optic carrier. Furthermore, by chamfering the inside and outside edges of the sealing surface, at least some of the epoxy may be caused to run down the carrier 22. Any epoxy that does run down the carrier 22 can be wiped away from the carrier 20 because there is a reduced amount of surface tension (or even substantially no surface tension) to hold the epoxy on the inner or outer diameter of the carrier 20 to optic interface 24. The optic interface 24 may be a very thin layer of epoxy that is of a substantially uniform thickness between the carrier 22 and optic 20 face. Any edge beading tends to create a thicker outer ring of epoxy that induces disadvantageous optical stresses. The fully assembled structure may be connected to the output coupler end of the laser such that the projection from the carrier 22 (including the optic 20 and the optic interface 24) fit inside of the vessel of the laser.

Figure 6:
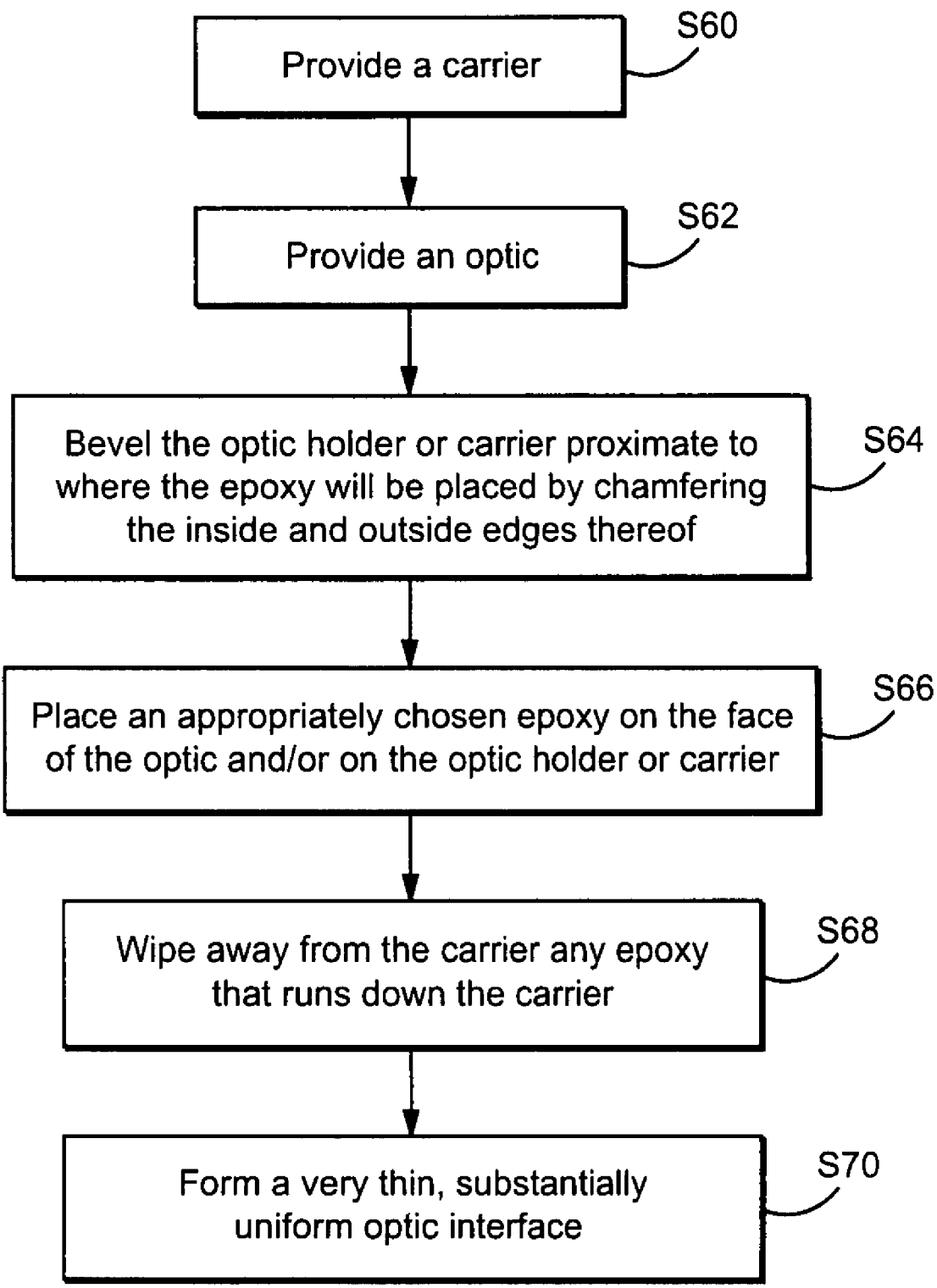

FIG. 6 is a flowchart that illustrates one process for forming an optical interface that may be used when optically mounting an optic to a carrier, in accordance with an example embodiment. A carrier is provided in step S60, and an optic is provided in step S62. In step S63, the optic holder or carrier may be beveled proximate to where the epoxy will be placed by chamfering the inside and outside edges thereof. In step S66, an appropriately chosen epoxy may be placed on the face of the optic and/or on the optic holder or carrier. Any epoxy that runs down the carrier may be wiped away in step S68. A very thin, substantially uniform optic interface may be formed in step S70. In a step not shown in FIG. 6, the fully assembled structure may be connected to the output coupler end of the laser such that the projection from the carrier (including the optic and the optic interface) fit inside of the vessel of the laser.

These techniques may produce certain advantages. For example, when there is a seal formed of a thin, substantially uniform layer of epoxy between the optic and the carrier, only a reduced amount (e.g., a substantially negligible amount) of stress is induced in the optic during the epoxy curing cycle. This may help to keep the optic in its correct place and undamaged. Corresponding techniques also tend to be inexpensive because any physical optic mounting or clamping components are optional and because the labor involved in such techniques is also reduced.

It will be appreciated that the carrier may be configured for many different arrangements. Thus, the snout configuration shown and described with reference to FIG. 5 is provided by way of example and without limitation. The snout configuration of FIG. 5 enables the carrier to be sealed to the laser vacuum vessel while the optic fits into (e.g., projects inwardly into) the vessel. Of course, it will be appreciated that in certain other example embodiments, the optic may be flush with the vessel, project outwardly from the vessel, etc. Also, in configurations where there are multiple cavities, multiple optics may be connected to a single carrier via multiple optic interfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A waveguide laser including a laser vessel, comprising:
   a carrier including an optic holder, the carrier being connected to an output coupler or rear mirror end of the laser;
   an optic mounted to the carrier via at least a face-sealing epoxy; and
   an optic interface formed at least in part by the epoxy, the optic interface being a thin layer of a substantially uniform thickness located between the carrier and optic face, the optic and the optic interface being inserted into the laser vessel, wherein the optic holder includes chamfered inner and outer edges of a surface where the optic interface is formed, and wherein the chamfered inner and outer edges of the optic holder are disposed so as to cause at least some of the epoxy to run down the carrier.

2. The waveguide laser of claim 1, wherein the epoxy is applied to the optic's face and/or to the optic holder's face.

3. The waveguide laser of claim 1, wherein the carrier and/or the optic holder of the carrier is/are beveled proximate to where the epoxy is applied.

4. The waveguide laser of claim 1, wherein the epoxy is not applied around a circumference of the optic.

5. The waveguide laser of claim 1, wherein the epoxy is selected and applied so as to provide reduced out-gassing, stability, and/or substantial non-permeability.

6. The waveguide laser of claim 1, further comprising a vacuum vessel, wherein the carrier is attached to the laser such that the optic and/or the optic interface attached to the carrier fit inside of the vessel.

7. The waveguide laser of claim 1, wherein the optic is an output coupler.

8. The waveguide laser of claim 1, wherein the laser is a $CO_2$ laser.

9. An optic mounting system for use with a laser comprising a laser vessel, comprising:
   a carrier including an optic holder, the carrier being connectable to an output coupler or rear mirror end of the laser;
   an optic mounted to the carrier via an epoxy; and
   an optic interface formed at least in part by the epoxy, the optic interface being a thin layer of a substantially uniform thickness located between the carrier and optic face, the optic and the optic interface being insertable into the laser vessel, wherein the optic holder includes chamfered inner and outer edges of a surface where the optic interface is formed, wherein the chamfered inner and outer edges of the optic holder are disposed so as to cause at least some of the epoxy to run down the carrier, wherein the carrier and/or the optic holder of the carrier are beveled proximate to where the optic interface is formed.

10. The optic mounting system of claim 9, wherein the epoxy is applied to the optic's face and/or to the optic holder's face.

11. The optic mounting system of claim 10, wherein the carrier and/or the optic holder of the carrier are beveled proximate to where the epoxy is applied.

12. The optic mounting system of claim 11, wherein the epoxy is not applied around a circumference of the optic.

13. The optic mounting system of claim 9, wherein the epoxy is selected and applied so as to provide reduced outgassing, stability, and/or substantial non-permeability.

14. A method of attaching an optic to a carrier for use with a gas discharge laser comprising a laser vessel, the method comprising:

providing the carrier, the carrier including an optic holder, the carrier being connectable to an output coupler or rear mirror end of the laser;

providing the optic;

beveling edges of the carrier and/or the optic holder to provide chamfered inner and outer edges;

applying a face-sealing epoxy to the optic face and/or the carrier or optic holder facet wherein the chamfered inner and outer edges of the optic holder are disposed so as to cause at least some of the epoxy to nm down the earner;

wiping away any epoxy that runs down the carrier; and forming, via the epoxy, a very thin, substantially uniform optic interface to connect the carrier and the optic, wherein the optic interface is formed on a surface of the optic holder including the chamfered inner and outer edges of the optic holder, wherein the optic and the optic interface are insertable into the laser vessel.

* * * * *